US006947381B2

(12) United States Patent
Wen et al.

(10) Patent No.: US 6,947,381 B2
(45) Date of Patent: Sep. 20, 2005

(54) METHOD FOR REDUCING PACKET LOSS BY PHASE TRANSITION IDENTIFICATION IN COMMUNICATION NETWORKS

(75) Inventors: Han C. Wen, San Jose, CA (US); Minh Duong-van, Menlo Park, CA (US); Tomas J. Pavel, San Jose, CA (US); Mark Crane, Reno, NV (US)

(73) Assignee: Network Physics, Inc., Menlo Park, CA (US)

( * ) Notice: Subject to any disclaimer, the term of this patent is extended or adjusted under 35 U.S.C. 154(b) by 849 days.

(21) Appl. No.: 09/846,449

(22) Filed: Apr. 30, 2001

(65) Prior Publication Data

US 2002/0159390 A1 Oct. 31, 2002

(51) Int. Cl.[7] .......................... H04J 3/14; H04L 12/26; G06F 11/00

(52) U.S. Cl. ...................... 370/231; 370/235; 370/253; 709/235

(58) Field of Search ................................ 370/229, 230, 370/231, 232, 235, 252, 253, 389, 395.1, 395.2, 395.21, 412, 428, 429, 468, 477; 709/232, 234, 235, 238; 710/29, 52, 56

(56) References Cited

U.S. PATENT DOCUMENTS

| | | | | | |
|---|---|---|---|---|---|
| 5,493,566 | A | * | 2/1996 | Ljungberg et al. | 370/231 |
| 6,081,843 | A | * | 6/2000 | Kilkki et al. | 709/232 |
| 6,167,030 | A | * | 12/2000 | Kilkki et al. | 370/236 |
| 6,333,917 | B1 | * | 12/2001 | Lyon et al. | 370/236 |
| 6,403,947 | B1 | * | 6/2002 | Hoyt et al. | 250/226 |
| 6,549,514 | B1 | * | 4/2003 | Kilkki et al. | 370/231 |
| 6,600,720 | B1 | * | 7/2003 | Gvozdanovic | 370/230 |
| 6,671,258 | B1 | * | 12/2003 | Bonneau | 370/235 |
| 6,674,717 | B1 | * | 1/2004 | Duong-van et al. | 370/230 |
| 6,778,499 | B1 | * | 8/2004 | Senarath et al. | 370/232 |

* cited by examiner

*Primary Examiner*—Alpus H. Hsu
(74) *Attorney, Agent, or Firm*—Blakely, Sokoloff Taylor & Zafman LLP.

(57) ABSTRACT

End-to-end packet losses of one or more traffic streams transmitted across a congested network may be reduced by setting the bandwidths of the corresponding traffic streams at critical values thereof at one or more control points along the network topology. The critical value of the bandwidths may be determined by monitoring buffer occupancy at the control point(s). Buffer occupancy may be determined by periodically sweeping down from a maximum bandwidth value according to a monotonically decaying exponential function.

12 Claims, 4 Drawing Sheets

METHOD FOR REDUCING PACKET LOSS BY PHASE TRANSITION IDENTIFICATION IN COMMUNICATION NETWORKS

FIELD OF THE INVENTION

The present invention relates to a scheme for congestion control/avoidance in communication networks that rely on packet switching techniques to transport information between nodes therein.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Due to finite resources, packets may be dropped rather than queued.

In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begin to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows and more and more nodes become saturated. Eventually, even a successfully delivered packet may be retransmitted because it takes so long to get to its destination (whereupon it may be acknowledged by the destination node) that the source actually assumes that the packet was lost and tries to retransmit it. Under such circumstances, the effective capacity of the network can be virtually zero.

Contrary to what one might believe, the solution to this problem is not simply to allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

It is clear that catastrophic network failures due to congestion should (indeed, must) be avoided and preventing such failures is the task of congestion control processes within packet switched networks. To date, however, the object of such congestion control processes has been to limit queue lengths at the various network nodes so as to avoid throughput collapse. Such non-TCP techniques require the transmission of some control information between the nodes and this overhead itself tends to limit the available network bandwidth for data traffic. Nevertheless, a good congestion control process maintains a throughput that differs from a theoretical ideal by an amount roughly equal to its control overhead.

Even these "good" congestion control processes, however, are not good enough. Studies of traffic flow across the Internet show that bandwidth of the various communication links is underutilized even in the presence of congestion. That is, even though excess capacity exists on the communication links that couple various nodes of the Internet to one another, packets are still being dropped within the network. One reason that conventional congestion control processes have failed in this fashion is that such processes do not take into account the true nature of network traffic.

SUMMARY OF THE INVENTION

End-to-end packet losses of one or more traffic streams transmitted across a congested network may be reduced by setting the bandwidths of the corresponding traffic streams at critical values thereof at one or more control points along the network topology. The critical value of the bandwidths may be determined by monitoring buffer occupancy at the control point(s). Buffer occupancy may be determined by periodically sweeping down from a maximum bandwidth value according to a monotonically decaying function, for example an exponential function.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A scheme for optimizing traffic flow in a computer network, such as the Internet, is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope. It should also be noted that as used herein the term "packet" is meant to broadly refer to packets, cells and other forms of information units used to transport data and/or control information within communications infrastructures (e.g., computer networks, telecommunications networks, data communication networks and the like, for example, the Internet) wherein resources are shared among multiple users and multiple information or traffic streams.

Existing congestion control approaches have generally viewed network traffic (e.g., the generation of new packets to be injected into a network) as essentially random processes. However, recent work in the area of traffic modeling has shown that network traffic is in fact chaotic in nature. None of the currently proposed congestion control methodologies capture or exploit this characteristic.

Figure 1:
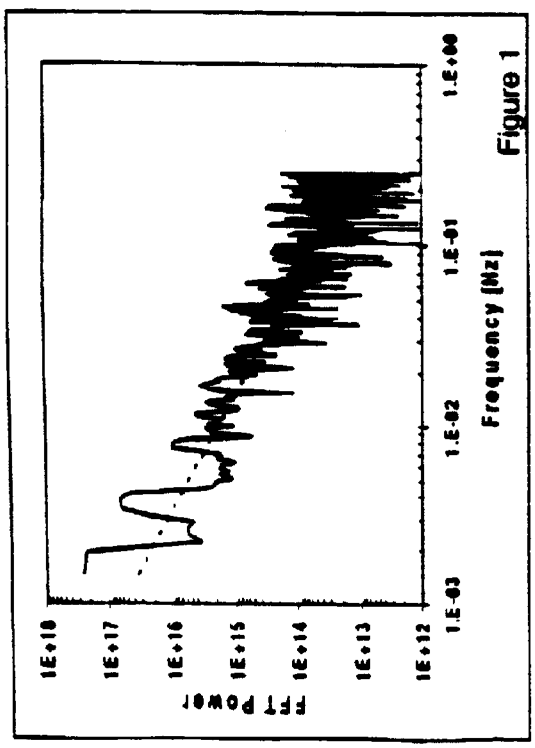
FIG. 1 shows the Fourier power spectrum of traffic generated from a Pareto distribution of file sizes that is not subjected to the TCP protocol.
Figure 2:
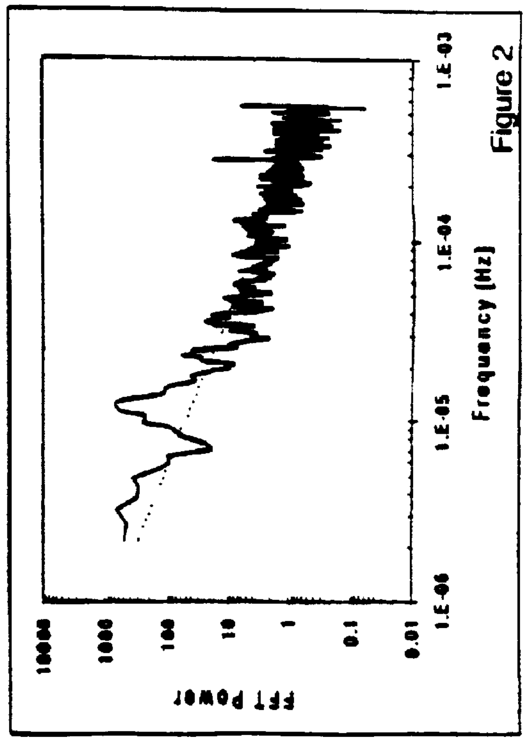
FIG. 2 shows the Fourier power spectrum of uncongested and under-supplied traffic that is subjected to the TCP protocol.
Figure 3:
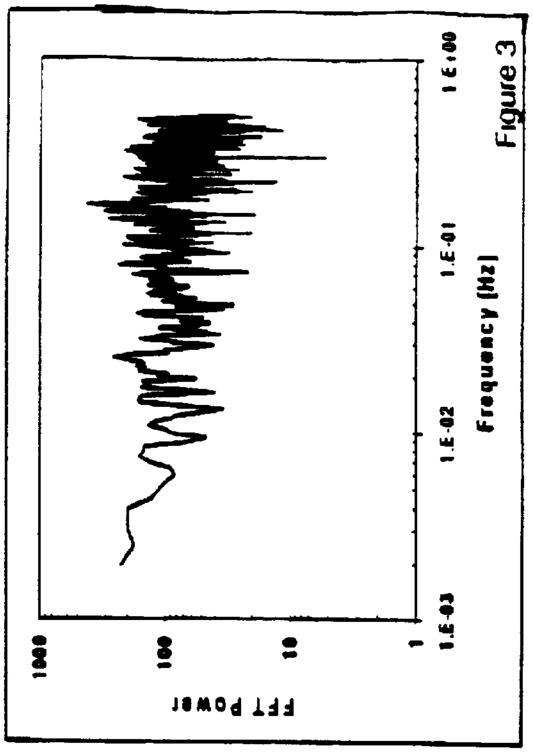
FIG. 3 shows the Fourier power spectrum of congested and over-supplied traffic that is subjected to the TCP protocol.

Other studies from the academic community have shown that the time series of network traffic throughput is not Poisson, but fractal. Namely, the "bursty" behavior seen in a time series at a given time scale is also seen at all other time scales. This "self-similarity" is one of the signatures that characterize a fractal time series. However, the present applicants have discovered that this "self-similar" signature is not present for heavily congested network traffic. The present applicants have verified that the traffic generated without any TCP protocol exhibits a fractal time series if the files transmitted are drawn randomly from a Pareto distribution of file sizes. The Fourier power spectrum in this case is a power law that on a log-log scale is linear, as shown in FIG. 1. This power law behavior is another signature of a fractal time series. The present applicants have also discovered that traffic flow with TCP protocol is also fractal, but only if the network topology is under-supplied with traffic. In this situation, the only significant portion of the TCP protocol responsible for the traffic dynamics is the receiver's window size. See FIG. 2. However, when the network topology is congested with traffic, the packet losses coupled with the non-linearity of the TCP congestion avoidance algorithm results in a time series that loses its fractality and multi-fractality. The corresponding Fourier power spectrum shows no power law behavior and is shown in FIG. 3. Even though the time series is not fractal, it is still chaotic.

The term "chaos" is used to describe the apparently random behavior exhibited by many deterministic nonlinear dynamical systems. Such systems manifest a rather remarkable phenomenon in that their deterministic property implies that all future states are determined from the present state. Thus, on one hand there is complete future knowledge of the system, while on the other there is seemingly random motion.

Chaos then is the long-term aperiodic behavior of a deterministic, nonlinear, dynamical system that exhibits sensitivity to initial conditions. Aperiodicity is the property that orbits never repeat themselves exactly; however they may get arbitrarily close to doing so, as observed in periodic windows. The other, perhaps more important, property is the sensitivity of the system to tiny perturbations. Consider two given points in phase space that are distinct but lie arbitrarily close to each other, then one might assume that their orbits will remain close forever. In fact, just the opposite is observed; the orbits separate exponentially in a bounded region of state space.

As indicated above, current congestion control processes simply do not take the chaotic network traffic characteristics into account and, therefore, cannot be expected to be optimum solutions to the congestion problem. What is needed therefore, is a congestion control scheme that does account for the chaotic nature of network traffic flow.

To more fully appreciate the present methods of traffic control, it is helpful to understand why network traffic is chaotic in nature. Consider then a series of packet transmissions between a source and a receiver. Suppose these transmissions take place across one or more networks, through one or more intervening nodes, such as switches and/or routers. Suppose further that the transmissions are controlled using the well-known transmission control protocol (TCP), as is true for most transmissions that take place across the Internet.

Very early in the development of the modem Internet, it was discovered that some control over the manner in which packets were injected into the network by the source was needed. Originally, TCP allowed a source to inject multiple packets into a network, up to a limit corresponding to a window or buffer size advertised by the receiver. Although such a scheme may work where the source and the receiver are connected to the same local area network, it was soon found that where routers having finite buffer sizes are disposed between the source and the receiver, problems arise as these routers soon run out of space to hold the incoming packets. To combat this problem Jacobson and Karels developed a "slow start" procedure wherein the source limits the rate at which it injects new packets into the network according to the rate at which acknowledgements of successful receptions are returned by the receiver. Van Jacobson and Michael J. Karels, "Congestion Avoidance and Control", Proceedings of SIGCOMM '88 (Stanford, Calif., August 1988), ACM.

Under the slow start procedure, a so-called congestion window is added to the source's TCP implementation. When a connection is established with a resource on another network, this congestion window is initialized to one segment (e.g., the segment or packet size advertised by the resource or a default packet size). Each time an acknowledgement is received, the congestion window is incremented and the source is allowed to inject a number of packets up to the minimum of the current congestion window size or the receiver's advertised window. Over time, the source's congestion window will grow exponentially until at some point the capacity of the intervening network is reached and some intermediate router begins dropping packets. This is an indication to the source that its congestion window has gotten too large. See, e.g., W. Richard Stevens, TCP/IP Illustrated, Vol. 1: The Protocols (1994) and Gary W. Wright and W. Richard Stevens, TCP/IP Illustrated, Vol. 2: The Implementation (1995).

At this point, and where the slow start process is run in concert with a conventional congestion avoidance procedure, the source resets its congestion window to one, and the process repeats up to the point at which the congestion window becomes half the size at which packet loss occurred previously. After this point, the congestion avoidance process takes over and begins incrementing the congestion window in a linear fashion (rather than in an exponential fashion as under the slow start process) in response to receiver acknowledgements.

This sudden change from an exponentially growing number of packets being injected to a linearly growing number of packets being injected presents a discontinuity. Such discontinuities are observed at the intervening router for each of the connections it is servicing. Moreover, the discontinuities appear at random as there is no synchronization between the different sources injecting packets into the network. It is the interaction between the discontinuities that result from the operation of the TCP and the randomness at which they are manifest at the routers within the network that gives rise to the chaotic nature of network (e.g., Internet) traffic.

While investigating the phenomena described above, the present applicants have discovered a technique for controlling congestion in such networks. In brief, a control point in a network is established and throughput between a traffic source feeding the control point and some downstream point (or points) is monitored. The monitoring is performed so as to identify a so-called "critical value" for a flow of packets from one or more traffic sources feeding the control point. This "critical value" of what will be termed the "controlled bandwidth" is detected, in one embodiment of the present invention, based on buffer occupancy at the control point. By then knowing the critical value, the present methods allow the output bandwidth of the control point to be set so as to minimize (and in some cases eliminate) downstream packet loss from the controlled traffic flows due to congestion. In essence, this method exploits the nonlinear dynamics of the chaotic flows of the network traffic; something which conventional congestion control processes simply do not do.

Under the present scheme, the end-to-end packet losses of one or more traffic streams transmitted across a congested network may be reduced by controlling the bandwidths (i.e., the inter-packet delay) of the corresponding traffic streams applied to downstream node(s) of the network from one or more control points along the network topology. This reduction in packet loss results in a reduction in fluctuations or variability of the controlled traffic streams, an increase in bandwidth utilization of a congested link at downstream points and a reduction in times to transmit files (e.g., to an end-user).

Figure 4:
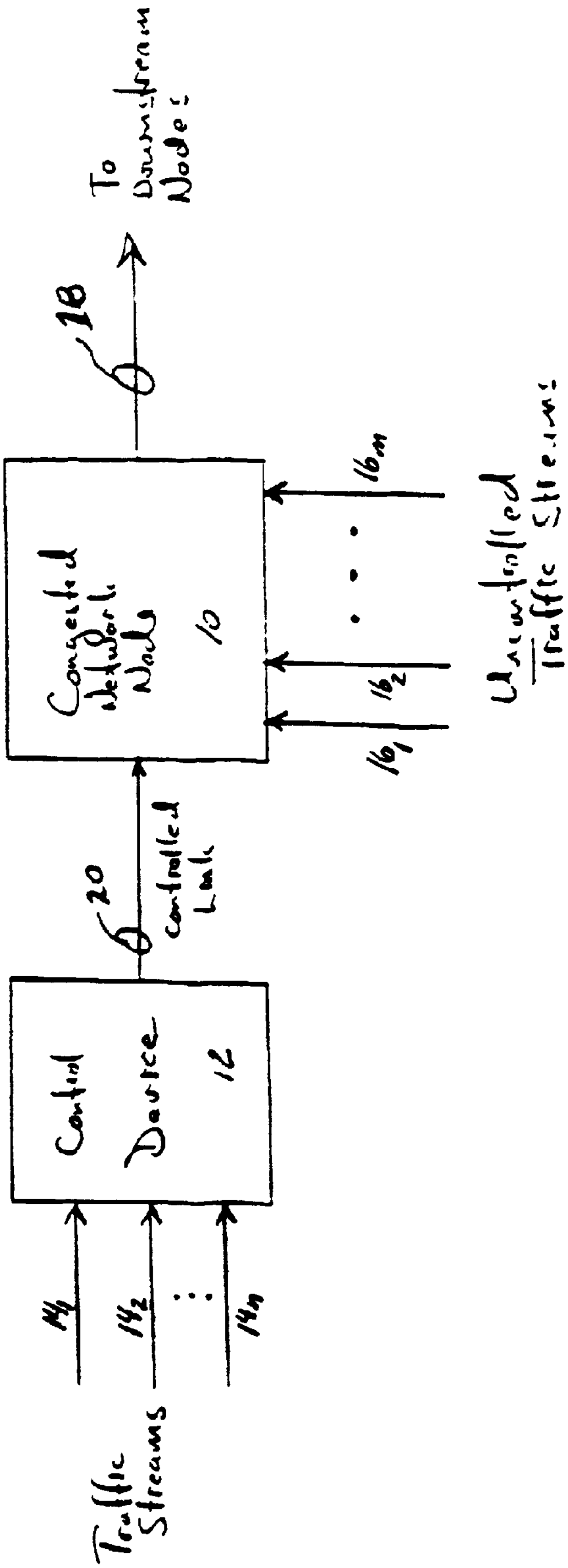
FIG. 4 illustrates a model of a computer network having a feedback control node upstream of an otherwise congested node in accordance with an embodiment of the present invention.

FIG. 4 illustrates an example of the use of a control device upstream of an otherwise congested network node in accordance with an embodiment of the present scheme. The otherwise congested node 10 is downstream of an upstream control node 12, which receives traffic (e.g., bursty HTTP (hypertext transfer protocol) traffic) on one or more communication links $\mathbf{14}_1$–$\mathbf{14}_n$. In other embodiments, control node 12 may be integrated in node 10 at the appropriate input or output thereof or may even, in some cases, be used downstream of node 10. Node 10 also receives traffic from several uncontrolled traffic sources $\mathbf{16}_1$–$\mathbf{16}_m$.

To provide for reduced congestion on communication link 18, which is an output from node 10, the output bandwidth (e.g., packets/time interval) from the control node 12 is limited to a value determined from monitoring the downstream congestion conditions. That is, by varying the rate of traffic transmitted on communication link 20, which couples the output of node 12 to an input of node 10, for example by controlling the delays between packets, downstream congestion control is achieved.

Figure 5:
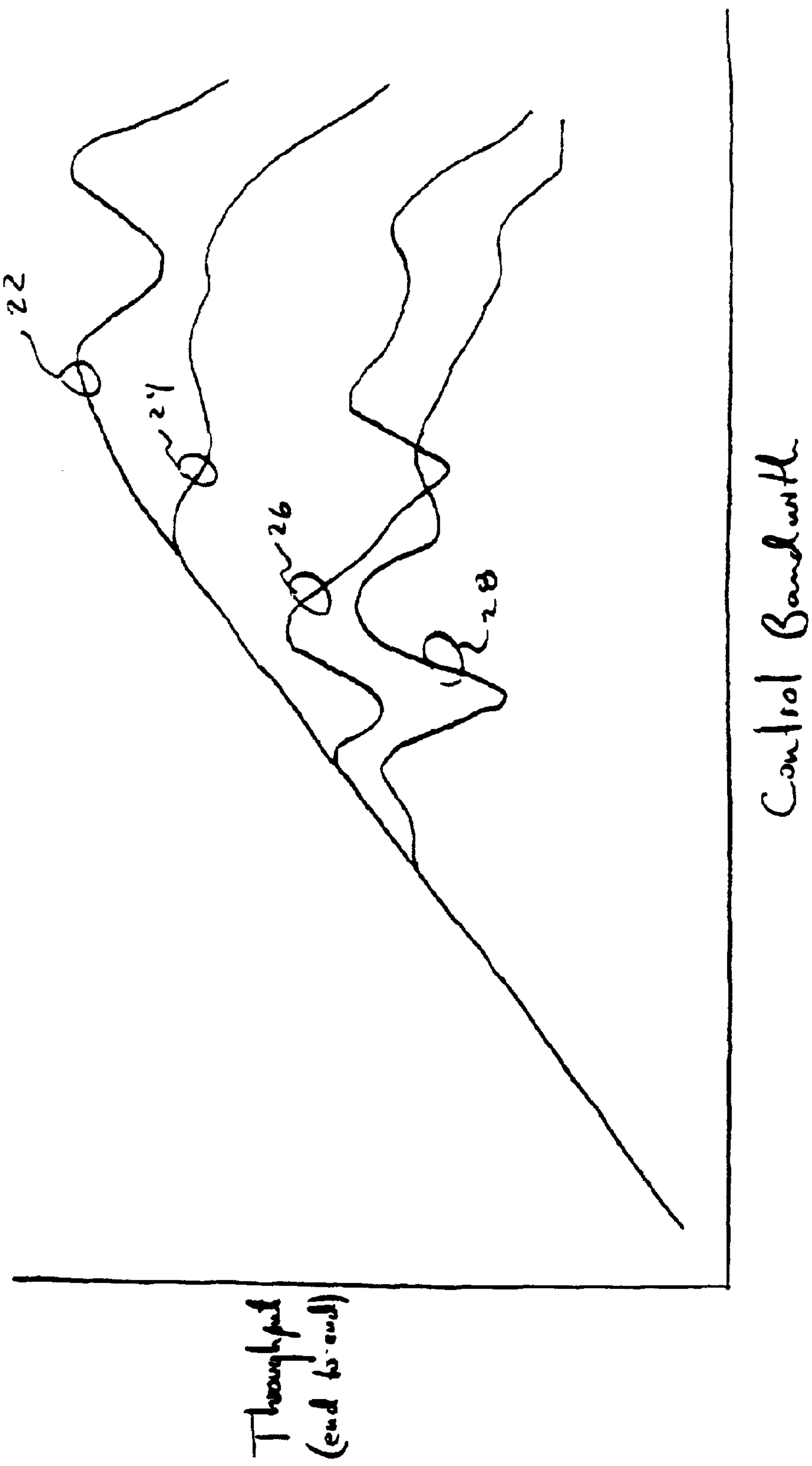
FIG. 5 is a graph illustrating, for varying cross-traffic conditions, the end-to-end throughput for traffic input to a control node as a function of the controlled bandwidth of the output of node.

To understand how the present control mechanisms operate, consider the graph of traffic flows shown in FIG. 5. This graph illustrates, for varying cross-traffic conditions, the end-to-end throughput for traffic input to control node 12 as a function of the controlled bandwidth of the output of node 12. In this case, controlled bandwidth refers to a controlled rate of output from node 12. Curve 22 illustrates this function for a case where there is little cross-traffic from streams $\mathbf{16}_1$–$\mathbf{16}_n$. Curves 24, 26 and 28 illustrate the throughput conditions in the cases of increasing cross-traffic from these sources. As indicated, as the amount of traffic from the uncontrolled streams increases, the effective end-to-end throughput of the controlled traffic first rises in a linear relationship as such traffic bandwidth is increased, but then becomes unstable (and indeed chaotic) at a point depending upon the amount of traffic from the uncontrolled streams. The linear portion of these curves have been observed experimentally as providing a near 1:1 relationship between end-to-end throughput and bandwidth, however, once the traffic conditions are such as to place the state of the network in the unstable portions of the curves, such relationships no longer hold true. It is in these regions that packets from the controlled traffic streams are dropped and as retransmissions of such packets occur (thus increasing the overall bandwidth of the controlled traffic streams) conditions only get worse.

The above curves point out that for given "cross-traffic" conditions (i.e., traffic form uncontrolled streams received at node 10), there will be a "critical value" or "critical point" at which the output bandwidth of the traffic on communication link 20 from node 12 will maximize end-to-end throughput for that traffic. This will be a point at which little or no packet drops will occur and may represent a preferred operating point for the network from the point of view of those users that are transmitting traffic over one of the controlled streams $\mathbf{14}_1$–$\mathbf{14}_n$. Of course, because the network is dynamic in nature, the critical point changes frequently, depending on the traffic conditions on the uncontrolled streams. The present applicants have determined a scheme for finding the critical point and then allowing traffic on the controlled streams to be throttled accordingly so as to maximize throughput for those streams.

Figure 6:
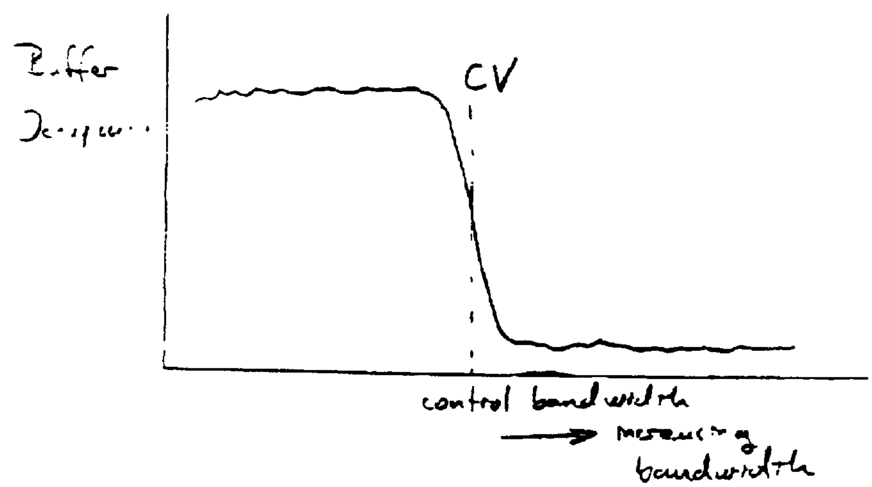
FIG. 6 is a graph of the buffer occupancy level of a control node plotted against the controlled bandwidth of that node and shows a phase transition point in buffer occupancy for a particular controlled bandwidth.

FIG. 6 illustrates a phenomenon that has been observed by the present applicants in their studies. Control node 12 includes one or mode buffers for its inbound traffic. When the buffer occupancy level is plotted against the controlled bandwidth for this traffic, one observes that as the controlled bandwidth is decreased the buffer occupancy increases at a nominal rate, until a sharp transition point (a phase transition) occurs. After this point, buffer occupancy is at or near its maximum and packet loss occurs. The "phase transition" may be understood by considering that as the controlled bandwidth is adjusted, there comes a point (the transition point) at which one imposes too severe a rate limit, and consequently the control node 12 is forced to buffer the excess supply of packets. The present applicants have determined that the onset of this phase transition corresponds to the critical value (cv) of the controlled bandwidth.

With this knowledge, controlling the traffic flows at node 12 becomes a relatively straightforward task. The critical value of the controlled bandwidth (which presents packet output rate, i.e., time between packet transmissions) can be determined by monitoring the buffer occupancy at node 12 (and changes thereto). When the critical point is found, this value is used as the output bandwidth over communication link 20 and packets are buffered at node 12 accordingly. Periodically, node 12 can reassess whether the critical value has shifted and change the control bandwidth accordingly. In this way, downstream congestion is minimized and fewer packets are expected to be lost.

One might undertake to determine the critical value of the control bandwidth using a variety of techniques. For example, an algorithmic search could be used. Experiments have shown, however, that such a search technique does not yield good results. Instead, such a search pattern tends to introduce instabilities into the network making it difficult to determine when the critical value has been reached. Another possibility is to use a search that sweeps from a low control bandwidth (i.e., high inter-packet transmission times) to a higher control bandwidth (i.e., low inter-packet transmission times). Again, however, experiments have shown that this type of search process does not yield satisfactory results because of delays in response time.

Figure 7:
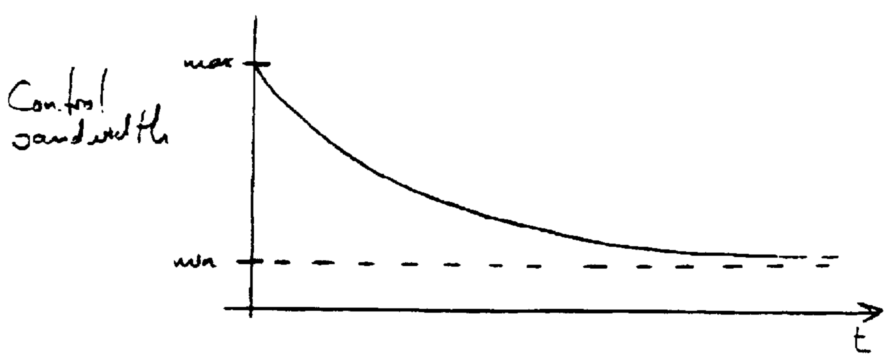
FIG. 7 illustrates a control bandwidth sweep which is initially set at a maximum value (max) and is then allowed to decrease monotonically according to an exponential function towards a minimum (min), until a critical value is found, in accordance with an embodiment of the present invention.

To date, experiments have shown that a search process that begins at a maximum value and ramps down yields the best results. That is, control node 12 searches for the present critical value of the control bandwidth by beginning at a maximum value and then decreases the bandwidth until the transition point in buffer occupancy is observed, thus indicating that the critical value has been reached. A preferred search process uses a monotonically decreasing exponential function as shown in FIG. 7. The control bandwidth is set at a maximum value (max) and is then allowed to decrease monotonically according to an exponential function towards a minimum (min), until the present critical value is found. When the critical value is found, the control bandwidth for communication link 20 is set accordingly, by controlling the buffer occupancy times at node 12 of course, other functions could also be used in this search process.

The value max may be chosen somewhat arbitrarily and good results have been obtained by setting max equal to one half of the incoming bandwidth at node 12 in the face of moderate network traffic conditions. The value min may be set as the average throughput value without any control, because it is known that the critical value must be greater than (or potentially equal to in the case of no cross-traffic) this value.

Thus a scheme for controlling traffic flow in a computer network has been described. By reducing the end-to-end packet loss using the present control mechanisms, traffic flow across the entire network topology is improved. The control methodology described herein can be applied on a port-by-port, link-by-link and/or traffic flow-by-traffic flow basis. That is, the control methods can be introduced at the physical or logical level, allowing true end-to-end quality of service (QoS) to be provided. It should be remembered that although the foregoing description and accompanying figures discuss and illustrate specific embodiments, the broader scope of present invention should be measured only in terms of the claims that follow.

What is claimed is:

1. A method, comprising controlling packet loss within a congested network by setting packet bandwidths over selected communication links within the network at one or more control points thereof, such packet bandwidths being set at critical values determined by monitoring congestion on one or more communication links of the network downstream from the control points and wherein the critical values are determined according to a period sweep which is performed using a monotonically decreasing function.

2. The method of claim 1 wherein the packet bandwidths are set by varying an inter-packet delay time over the selected communication links at the control points.

3. A method, comprising monitoring buffer occupancy level at a control node of a network as packet output rate from the control node is decreased monotonically, and setting the packet output rate at a value corresponding to a phase transition point in the buffer occupancy level.

4. The method of claim 3 further comprising periodically determining whether the phase transition point has changed reliable to the packet output rate and resetting the packet output rate accordingly.

5. The method of claim 3 wherein the phase transition point corresponding to a change in buffer occupancy from a normal level to a level at or near a maximum buffer capacity.

6. A method, comprising setting an inter-packet transmission time for a control node in a network to a point corresponding to a phase transition in a buffer occupancy levels in the control node, wherein the phase transition point is determined by monitoring the buffer occupancy level for vanable inter-packet transmission times and the inter-packet transmission times are varied according to a decreasing function.

7. The method of claim 6 wherein the phase transition corresponds to a change in buffer occupancy from a nominal level to a level at or near a maximum buffer capacity.

8. The method o claim 6 further comprising resetting the inter packet transmission time according to variation in the phase transition point.

9. The method of claim 6 wherein the function decreases monotonically.

10. The method of claim 9 wherein the function comprises an exponential function.

11. The method of claim 6 wherein the function comprises an exponential function.

12. A method, comprising setting an inter-packet transmission time for a control node in a network to a point corresponding to a phase transition in a buffer occupancy levels in the control node, wherein the phase transition point is determined by monitoring the buffer occupancy level for variable inter-packet transmission times and the inter-packet transmission times are varied according to one of: an algorithm search process, a search process that sweeps from high inter-packet transmission times to low inter-packet transmission times, or a search process that sweeps from low inter-packet transmission times to high inter-packet transmission times.

* * * * *